United States Patent
Goslin et al.

(10) Patent No.: US 10,664,989 B1
(45) Date of Patent: May 26, 2020

(54) SYSTEMS AND METHODS TO PRESENT INTERACTIVE CONTENT BASED ON DETECTION OF MARKERS

(71) Applicant: Disney Enterprises, Inc., Burbank, CA (US)

(72) Inventors: Michael P. Goslin, Burbank, CA (US); Elliott Baumbach, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/226,056

(22) Filed: Dec. 19, 2018

(51) Int. Cl.
  *G06T 7/70* (2017.01)
  *G06T 11/60* (2006.01)

(52) U.S. Cl.
  CPC .............. *G06T 7/70* (2017.01); *G06T 11/60* (2013.01); *G06T 2207/30204* (2013.01)

(58) Field of Classification Search
  CPC ..................................................... G06T 19/006
  See application file for complete search history.

(56) References Cited

U.S. PATENT DOCUMENTS

| | | | |
|---|---|---|---|
| 8,224,024 B2 | 7/2012 | Foxlin | |
| 8,542,906 B1 | 9/2013 | Persson | |
| 9,058,764 B1 | 6/2015 | Persson | |
| 9,070,194 B2 | 6/2015 | Lee | |
| 9,092,896 B2 | 7/2015 | Scavezze | |
| 9,105,210 B2 | 8/2015 | Lamb | |
| 2008/0266323 A1 | 10/2008 | Biocca | |
| 2012/0229508 A1 | 9/2012 | Wigdor | |
| 2015/0070387 A1 | 3/2015 | Schmalstieg | |
| 2015/0106200 A1* | 4/2015 | Elmekies | G06Q 30/0255 705/14.53 |
| 2016/0078683 A1* | 3/2016 | Sudol | G06T 19/006 345/633 |
| 2017/0046876 A1* | 2/2017 | Bean | G06T 19/006 |
| 2017/0270698 A1 | 9/2017 | Goslin | |
| 2017/0344124 A1* | 11/2017 | Douxchamps | G06T 19/006 |
| 2018/0204060 A1* | 7/2018 | Merchant | G06K 9/00671 |

OTHER PUBLICATIONS

Statt, "Microsoft's HoloLens explained: How it works and why it's different" URL: http://www.cnet.com/news/microsoft-hololens-explained-how-it-works-and-why-its-different/ (9 pages) [retrieved Nov. 20, 2015].

Wilson et al., "Steerable Augmented Reality with the Beamatron", http://research.microsoft.com/en-us/um/people/benko/publications/2012/Beamatron.pdf , Oct. 10, 2012 (10 pages).

* cited by examiner

*Primary Examiner* — Phi Hoang
(74) *Attorney, Agent, or Firm* — Esplin & Associates, PC

(57) ABSTRACT

This disclosure presents systems and methods to present augmented reality content based on detection of augmented reality markers. A first presentation device may detect presence of a first marker of a set of augmented reality markers. The first presentation device may present a second marker of the set of augmented reality markers. A second presentation device may detect presence of the second marker presented on the first presentation device. One or both of the first presentation device and/or second presentation device may effectuate presentation of virtual content associated with the set of augmented reality markers.

21 Claims, 6 Drawing Sheets

US 10,664,989 B1

SYSTEMS AND METHODS TO PRESENT INTERACTIVE CONTENT BASED ON DETECTION OF MARKERS

FIELD

This disclosure relates to systems and methods to present interactive content based on detection of markers.

BACKGROUND

Devices and systems are available to provide virtual reality (VR) and/or augmented reality (AR) experiences. In particular, handheld and/or wearable technology may be used. Wearable technology may include head-mounted displays (HMD). Handheld technology may include mobile computing platforms, such as smart phones and/or tablets.

SUMMARY

One aspect of the disclosure relates to a system configured to present interactive content based on detection of markers. Interactive content may refer to content presented within an interactive environment. An interactive environment may include one or more of a virtual reality environment, an augmented reality environment, and/or other interactive environment. An augmented reality environment may include views of images of virtual content within a virtual environment superimposed over views of a real-world environment. In some implementations, a user may actively view the real-world environment, for example, through a visor. In some implementations, a user may passively view the real-world environment, for example, through a display that presents images of the real-world environment. A virtual reality environment may include views of images of virtual content within a virtual environment. Virtual content may include one or more virtual objects and/or other virtual content. The terms "space" and "environment" in the context of virtual reality and/or augmented reality may be used interchangeably herein.

It is noted that one or more implementations of the systems and methods presented herein may be directed to presenting augmented reality content within an augmented reality environment based on detection of augmented reality markers. However, this is for illustrative purpose only and is not to be considered limiting. For example, those skilled in the art may appreciate that the features and/or functions described herein may be implemented within a virtual reality environment and/or other interactive environment without departing from the scope of the present disclosure.

Some augmented reality systems may utilize physical markers and/or features of physical objects as reference points for placing virtual objects within an interactive environment and/or to orient a camera view to the physical world. When an image depicting a virtual object is rendered on a display, the virtual object may be perceived by a user as being present in the physical world. When a marker is detected and/or identified, it may reveal and position a virtual object. That virtual object can itself be a marker, and/or even a part or component of a marker. The present disclosure contemplates a user experience where augmented reality markers and/or parts thereof may be presented on a physical object and/or on displays of mobile computing platforms of users. In some implementations, multiple parts of markers may be arranged together by arranging the mobile computing platforms to reveal a new (or assembled or partially assembled) augmented reality marker that yet another mobile computing platform may detect in order to unlock a new virtual object. In this way, "nested" levels of augmented reality markers and/or marker parts may be created that act like a multi-level puzzle. The "top" augmented reality marker may be revealed by revealing and arranging all "lower-level" markers. For example, a third level marker may be unlocked by first detecting a first marker with a first device. Detecting the first marker may cause the first device to display a second marker. A second device may detect the second marker (displayed on the first device) which may causes the second device to display and "reveal" the third marker. This process may continue beyond three detections. The reveal of the third marker may cause a hidden virtual object to be revealed and/or the third marker may itself may be a hidden virtual object. In some implementations, individual parts of a marker may be required to be arranged with certain spatial arrangement to form an assembled version of the marker. In some implementations, multiple markers in a set of markers may be required to be arranged with certain spatial arrangement to form an assembled version of the set of markers.

In some implementations, a system configured to present augmented reality content based on detection of augmented reality markers may include one or more of one or more presentation devices, one or more servers, and/or other components. Individual ones of the one or more presentation devices may include one or more of one or more physical processors, non-transitory electronic storage, and/or other components.

Individual presentation devices of one or more presentation devices may be configured to generate images of virtual content. An individual presentation device may be configured to present images of virtual content such that the virtual content may be perceived by a user as being located in a real-world environment.

Non-transitory electronic storage of a presentation device may be configured to store one or more of virtual content information, marker information, and/or other information. The virtual content information may define virtual content. The virtual content may include one or more virtual objects and/or other virtual content. The marker information may define augmented reality markers and/or specify associations between virtual content the augmented reality markers. Virtual content may be associated with an augmented reality marker in that detection of the augmented reality marker may cause the virtual content to appear in an interactive space. By way of non-limiting illustration, the marker information may define a set of nested augmented reality markers and/or may specifying an association of a virtual object with the set of augmented reality markers.

One or more physical processors of a presentation device may be configured by machine-readable instructions. Executing the machine-readable instructions may cause the one or more physical processors to facilitate presenting augmented reality content based on detection of augmented reality markers. The machine-readable instructions may include one or more computer program components. The one or more computer program components may include one or more of a content component, a detection component, and/or other components.

The content component may be configured to obtain information stored by non-transitory electronic storage and/or other information.

The detection component may be configured to detect presence of augmented reality markers and/or parts of augmented reality markers. By way of non-limiting illustration, the detection component of a first presentation device may be configured to detect presence of a first marker of the set of augmented reality markers.

The control component may be configured to control a presentation device to effectuate presentation of one or more of markers, parts of markers, and/or virtual content. By way of non-limiting illustration, the control component of the first presentation device may be configured to, in response to the detection of the first marker, effectuate presentation of an image of a second marker of the set of augmented reality markers. The detection component of a second presentation device may be configured to detect presence of the second marker and/or other markers of the set of augmented reality markers presented on the first presentation device and/or other devices.

The control component of one or more of the first presentation device, second presentation device, and/or other presentation devices may be configured to control the respective presentation devices to effectuate presentation of individual images of the virtual content associated with individual markers and/or sets of nested markers. By way of non-limiting illustration, in response to the detection of the second marker and/or other markers of the set of augmented reality markers, one or more presentation devices may present an image of the virtual object associated with the set of nested augmented reality markers so that the virtual object may be perceived as being located in the real-world environment.

In some implementations, one or more servers may include one or more physical processors including machine-readable instructions the same as or similar to the machine-readable instructions of the individual presentation devices. The one or more servers may communicate with the one or more presentation devices via a client/server architecture. The one or more servers may further store one or more of virtual content information, marker information, and/or other information. Responsive to detection of markers by the individual presentation devices, the individual presentation devices may send requests to the one or more servers for the virtual content information and/or marker information. The one or more servers may serve the information to the individual presentation device so that the individual presentation devices may present additional markers and/or virtual content associated with the markers.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
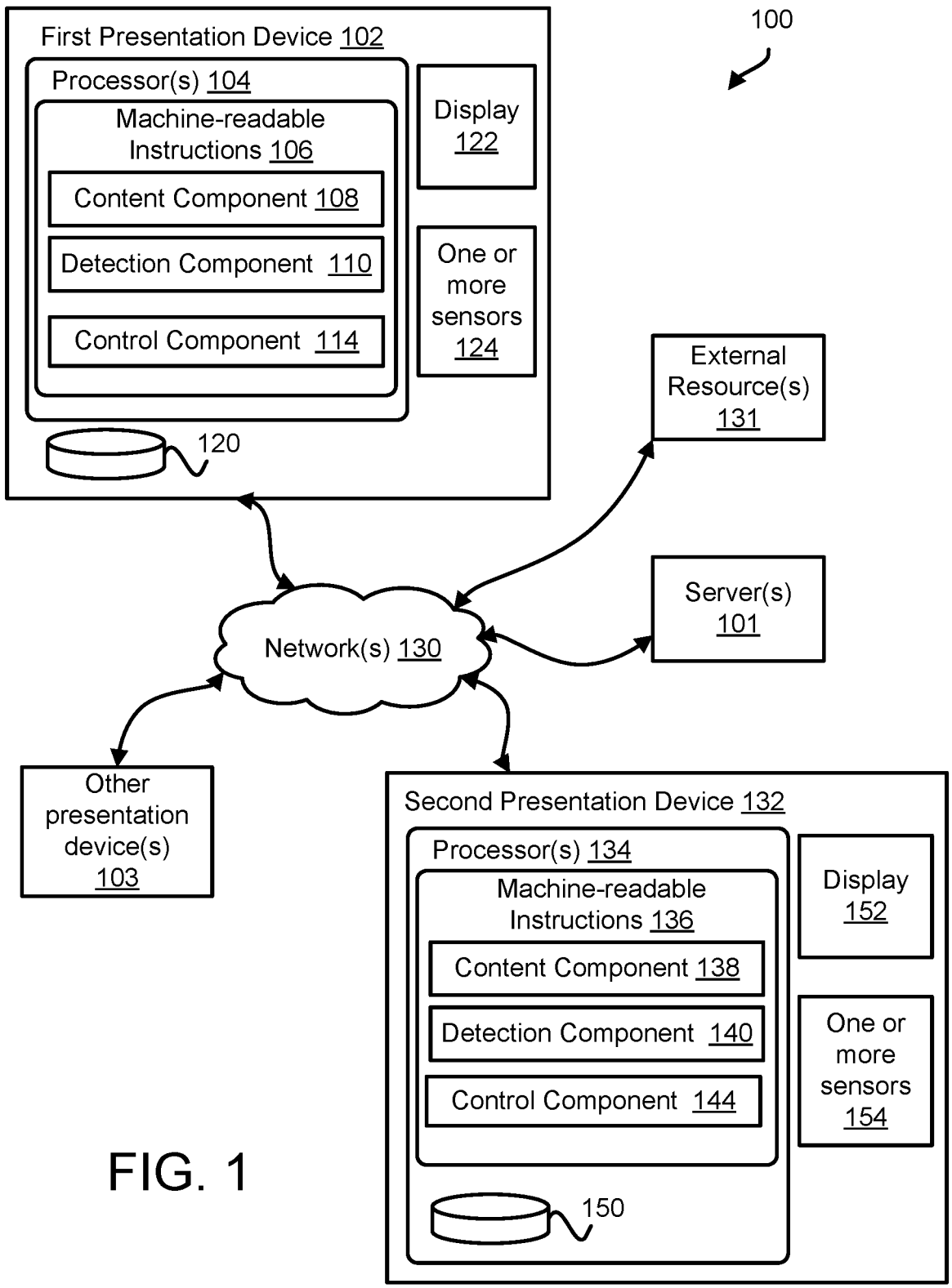
FIG. 1 illustrates a system configured to present interactive content based on detection of markers, in accordance with one or more implementations.

FIG. 1 illustrates a system 100 configured to present interactive content based on detection of markers. Interactive content may refer to content presented within an interactive environment. An interactive environment may include one or more of a virtual reality environment, an augmented reality environment, and/or other interactive environment. An augmented reality environment may include views of images of virtual content within a virtual environment superimposed over views of a real-world environment. In some implementations, a user may actively view the real-world environment, for example, through a visor. In some implementations, a user may passively view the real-world environment, for example, through a display that presents images of the real-world environment. A virtual reality environment may include views of images of virtual content within a virtual environment. Virtual content may include one or more virtual objects and/or other virtual content. The terms "space" and "environment" in the context of virtual reality and/or augmented reality may be used interchangeably herein.

It is noted that one or more implementations of the systems and methods presented herein may be directed to presenting augmented reality content within an augmented reality environment based on detection of augmented reality markers. However, this is for illustrative purpose only and is not to be considered limiting. For example, those skilled in the art may appreciate that the features and/or functions described herein may be implemented within a virtual reality environment and/or other interactive environment without departing from the scope of the present disclosure.

The system 100 may include one or more of a first presentation device 102, a second presentation device 132, one or more other presentation devices 103 (e.g. a third presentation device, fourth presentation device, . . . nth presentation device), one or more external resources 131, one or more servers 101, and/or other components. While some descriptions herein may be directed to features and/or functions of first presentation device 102 and/or second presentation device 132, it is to be noted that other ones of one or more other presentation devices 103 may be configured similarly as first presentation device 102 and/or second presentation device 132. Further, it is noted that the features and/or functions of first presentation device 102 may be attributed to second presentation device 132, and vice versa.

The first presentation device 102 may include one or more of one or more physical processors 104 (also referred to as processor(s) 104), non-transitory electronic storage 120, a display 122, one or more sensors 124, and/or other components.

The one or more physical processors 104 may be configured to provide information-processing capabilities in first presentation device 102. As such, in some implementations, processor(s) 104 may include one or more of a digital processor, an analog processor, a digital circuit designed to process information, an analog circuit designed to process information, a state machine, and/or other mechanisms for electronically processing information.

In some implementations, one or more physical processors 104 may be configured to provide remote hosting of features and/or functions of machine-readable instructions 106 to first presentation device 102. In some implementations, one or more physical processors 104 may be remotely located from first presentation device 102. The one or more physical processors 104 may communicate with first presentation device 102, via client/server architecture, and/or other communication schemes. By way of non-limiting illustration, one or more physical processors 104 may comprise one or more computing platforms. In some implementations, one or more physical processors 104 may comprise processor(s) within one or more servers 101. As such features and/or functions of one or more physical processors 104 may be attributed to one or more servers 101 and served to first presentation device 102 and/or other presentation devices via client/server architecture.

In some implementations, one or more physical processors 104 may be configured to provide local hosting of features and/or functions of machine-readable instructions 106 to first presentation device 102. In some implementations, one or more physical processors 104 may be included with and/or coupled to first presentation device 102. The one or more physical processors 104 may communicate with first presentation device 102 via local wired and/or wireless connections (e.g., USB, BLE and/or other connections), and/or other communication schemes.

In some implementations, one or more physical processors 104 may be removably coupled to first presentation device 102. By way of non-limiting illustration, one or more physical processors 104 may be included in a mobile computing platform (not shown in FIG. 1). The mobile computing platform may include one or more of a cellular telephone, a smartphone, a laptop, a tablet computer, an AR/VR platform, and/or other computing platform. The mobile computing platform may be removably attachable to first presentation device 102.

In some implementations, first presentation device 102 may itself comprise a mobile computing platform. The mobile computing platform may include one or more of a cellular telephone, a smartphone, a laptop, a tablet computer, and/or other computing platform. Such an implementation may provide an augmented reality environment with passive views of the real world.

The display 122 may be configured to present virtual content, views of the real world, and/or other content. Virtual content may be in the form of images, video, text, and/or other content. Views of the real world may be in the form of images and/or video. Presentation of content via display 122 of first presentation device 102 may be facilitated by control signals communicated to display 122 (see, e.g., control component 114). The display 122 may include one or more of a screen, a set of screens, a touchscreen, a monitor, and/or other displays.

In some implementations, display 122 may be configured to present virtual content individually to each eye of a user as stereoscopic pairs. In some implementations, first presentation device 102 may comprise, for example, a headset (not shown in FIG. 1). When first presentation device 102 is installed on a user's head, the user's gaze may be directed towards first presentation device 102 (or at least display 122) to view content presented by and/or on display 122.

In some implementations, display 122 may include one or more of a transparent, semi-transparent, reflective, and/or semi-reflective display component. Images of virtual content may be presented on display 122 such that the user may view the images presented on display 122 as well as the real world through display 122. The virtual content may be perceived as being present in the real world. Such a configuration may provide an interactive space comprising an augmented reality environment with an active view of the real world.

In some implementations, display 122 may comprise a display screen configured to present virtual content. The user may view the display screen such that the display screen may encompass, substantially or entirely, the user's vision without providing views of the real world through the display screen. Such a configuration may provide an interactive space comprising a virtual reality environment.

Individual sensors of one or more sensors 124 may be configured to generate output signals. In some implementations, an individual sensor may include one or more of an orientation sensor, an image sensor, and/or other sensors.

An orientation sensor may be configured to generate output signals conveying orientation information and/or other information. Orientation information derived from output signals of an orientation sensor may define an orientation of first presentation device 102. In some implementations, orientation of first presentation device 102 may refer to one or more of a pitch angle, a roll angle, a yaw angle, a heading, a pointing direction, a bearing, and/or other measurements. An orientation sensor may include an inertial measurement unit (IMU) such as one or more of an accelerometer, a gyroscope, a magnetometer, Inclinometers, and/or other devices.

In some implementations, an image sensor may be configured to generate output signals conveying image information. Image information may define images of the real world. Image information may specify visual content within a field of view of the image sensor. The visual content may include real-world objects and/or surfaces present in the real world. The image information may specify visual content in the form of pixels in an image. Pixels may be defined by one or more of location (e.g., two-dimensional coordinates), color, transparency, and/or other information. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other image sensors.

The images of the real world may be used to detect presence of augmented reality markers in the real world. Detection of presence of augmented reality markers may be performed using one or more image-processing techniques. One or more image processing techniques may include one or more of bundle adjustment, speeded up robust features (SURF), scale-invariant feature transform (SIFT), computer vision, and/or other techniques. In some implementations, an augmented reality marker may include one or more of an image, a glyph, word, a shape, a design, a color, and/or other marker. A glyph may comprise one or more of a letter, a symbol, a pictograph, and/or other glyph.

The non-transitory electronic storage 120 may be configured to store one or more of virtual content information, marker information, and/or other information.

The virtual content information may define a virtual environment including virtual content. The virtual content may include one or more virtual objects.

The marker information may define augmented reality markers and/or virtual content associated with the augmented reality markers. Virtual content may be associated with an augmented reality marker by virtue of detection of the augmented reality marker causing the associated virtual content to appear and/or be unlocked in an interactive space. In some implementations, individual markers may be comprised of multiple parts. The multiple parts may be arranged and/or assembled to form the individual markers. In some implementations, arrangement and/or assembly of parts of a marker may require individual orientations of the individual parts to be aligned and/or the individual parts to be within a threshold distance. In some implementations, orientation may refer to one or more of an pitch angle, an roll angle, an yaw angle, an heading, an pointing direction, an bearing, and/or other measurements of spatial relationship between markers and/or marker parts. In some implementations, alignment may include one or more of parallel, orthogonal, in-line, co-axial, and/or other considerations of alignment.

By way of non-limiting illustration, a first marker may be associated with a first virtual object and/or other virtual object. The first marker may be comprised of one or more of a first part, a second part, and/or other parts. One or more of the first part, second part, and/or other parts may be arranged and/or assembled to form the first marker. For illustrative purposes, the first marker may be considered as being formed of the first part and the second part. However, it is noted that implementations may include markers having more than two parts. The first part may be required to be arranged with the second part to form the first marker. The arrangement may require one or more of a first heading of the first part to be aligned with a second heading of the second part, and/or the first part to be within a threshold distance from the second part.

In some implementations, markers and/or marker parts may form a "nested" arrangement. In a nested arrangement, multiple markers may be included in a set of nested markers. The markers in the set of nested markers may follow an order. The markers may be "nested" insofar that previous markers may act to reveal the subsequent markers in the order. For example, first presentation device 102 may be configured to generate and display a second marker in a set of nested markers upon detecting a first marker in the set of nested markers. The second presentation device 132 may be configured to generate and display (e.g., "reveal") a third marker in the set of nested markers upon detection of the second marker displayed on the first presentation device 102. This process may continue with subsequent presentation devices (e.g., a third presentation device thru Nth presentation device) to continuously reveal subsequent markers in the set of nested markers. In some implementations, the individual detections may reveal hidden virtual content and/or a detection of the "final" marker in the set of nested markers may reveal hidden virtual content. In some implementations, revealing subsequent markers may require detecting a predefined arrangement of multiple markers acting as parts. For example, a presentation device may be configured to unlock the nth marker when markers 1 thru 4 are detected to be adjacent to each other, arranged in a square, triangle, and/or other predefined spatial arrangement.

In some implementations, one or more virtual objects in a first set of virtual objects may act as a marker to unlock a second set of virtual objects. The first set of virtual objects may be, for example, virtual objects in a subsequent "unlocked" level of a game. For example, the users of the presentation devices may play a game with the first set of virtual objects, where unlocking a second set of virtual objects (i.e. in the second level in the game) may require detecting a predefined positioning/arrangement of one or more of the virtual objects in the first set by one or more of the presentation devices. The predefined position of the one or more virtual objects in the first set may be used as the marker(s) which anchor an initial position of the virtual object(s) in the second set of virtual objects.

The one or more physical processors 104 may be configured by machine-readable instructions 106. Executing machine-readable instructions 106 may cause one or more physical processors 104 to facilitate presenting augmented reality content based on detection of augmented reality markers. The machine-readable instructions 106 may include one or more computer program components. The one or more computer program components may include one or more of a content component 108, a detection component 110, a control component 114, and/or other components.

The content component 108 may be configured to obtain one or more of virtual content information, marker information, and/or other information stored by electronic storage 120 and/or other storage locations.

The detection component 110 may be configured to perform one or more of detect presence of individual markers and/or marker parts within a real-world environment, determine locations of the individual markers and/or marker parts within the real-world environment, determine marker orientations of the individual markers and/or individual parts within the real-world environment, and/or other operations. Marker orientation may refer to one or more of a marker pitch angle, a marker roll angle, a marker yaw angle, a marker heading, a marker pointing direction, a marker bearing, and/or other measurements of spatial arrangement.

In some implementations, detection component 110 may detect the presence of individual markers and/or parts within a field of view of an image sensor included in one or more sensors 124. Detection component 110 may obtain the output signals generated by the image sensor. Detection component 110 may detect the presence of individual markers and/or parts based on image information conveyed by the output signals, and/or other information. The image information may define visual content depicting the individual markers, parts, and/or other content. In some implementations, detection component 110 may utilize one or more image processing techniques to detect presence of the individual markers and/or parts, determine locations of the individual markers and/or parts within the real-world environment, determine marker orientations of the individual markers and/or parts within the real-world environment, and/or perform other operations. One or more image processing techniques may include one or more of bundle adjustment, speeded up robust features (SURF), scale-invariant feature transform (SIFT), computer vision, and/or other techniques.

By way of non-limiting illustration, detection component 110 of first presentation device 102 may be configured to detect presence of the first part of the first marker and/or other parts of the first marker and/or other markers. In some implementations, the first part of the first marker may be depicted on a physical object. The physical object may include a card and/or other physical object. In some implementations, the first part of the first marker may be presented on a display of a presentation device.

The control component 114 may be configured to control first presentation device 102 (e.g., via display 122) to generate and/or present images of virtual content and/or markers. The control component 114 may be configured to control first presentation device 102 (e.g., via display 122) to generate and/or present images of parts of markers in response to detection of other parts of the markers. The control component 114 may be configured to control first presentation device 102 (e.g., via display 122) to generate and/or present images of virtual content associated with individual markers in response to detection of assembled and/or arranged parts forming the markers. In some implementations, control component 114 may be configured to control first presentation device 102 (e.g., via display 122) to generate and/or present one or more notifications to prompt assembly and/or arrangement the individual parts of individual markers. The notification may include one or more of a text notification, an audible notification, and/or other notifications.

By way of non-limiting illustration, control component 114 may be configured to control first presentation device 102 to generate an image of the second part of the first marker in response to detecting the presence of the first part of the first marker. The control component 114 may be configured to control first presentation device 102 (e.g., via display 122) to generate and/or present one or more notifications to prompt the user of the first presentation device 102 to assemble and/or arrange the presented second part of the first marker with the detected first part of the first marker. The user of the first presentation device 102 may arrange the presented second part at or near the first part so that the assembled first marker may be portrayed. For example, the first marker may comprise an image; the first part may comprise half of the image; and the second part may comprise the other half of the image.

It is noted that the detection of markers and/or subsequent presentation of markers, marker parts, and/or virtual content may follow the technique of "nested" markers as described herein. By way of non-limiting illustration, the detection component 110 may be configured to presence of a first marker of a set of nested augmented reality markers. In response to the detection of the first marker, the control component 114 may be configured to control first presentation device 102 to effectuate presentation of an image of a second marker of the set of nested augmented reality markers.

The second presentation device 132 may include one or more of one or more physical processors 134, non-transitory electronic storage 150, a display 152, one or more sensors 154, and/or other components.

One or more physical processors 134 may be configured to provide information-processing capabilities in second presentation device 132. The one or more physical processors 134 may be the same as or similar to one or more physical processors 104 of first presentation device 102, described herein. That is, one or more physical processor 134 of second presentation device 132 may provide the same or similar functionality to second presentation device 132 as one or more physical processors 104 provides to first presentation device 102.

The display 152 may be the same as or similar to display 122 of first presentation device 102, described herein. That is, display 152 of second presentation device 132 may provide the same or similar functionality to second presentation device 132 as display 122 provides to first presentation device 102.

The one or more sensors 154 may be the same as or similar to one or more sensors 124 of first presentation device 102, described herein. That is, one or more sensors 154 of second presentation device 132 may provide the same or similar functionality to second presentation device 132 as one or more sensors 124 provides to first presentation device 102.

The non-transitory electronic storage 150 may be configured to store one or more of virtual content information, marker information, and/or other information.

The one or more physical processors 134 may be configured by machine-readable instructions 136. Executing machine-readable instructions 136 may cause one or more physical processors 134 to facilitate presenting augmented reality content based on detection of augmented reality markers. The machine-readable instructions 136 may include one or more computer program components. The one or more computer program components may include one or more of a content component 138, a detection component 140, a control component 144, and/or other components.

The content component 138 may be configured to obtain one or more of virtual content information, marker information, and/or other information stored by electronic storage 150 and/or other storage locations.

The detection component 140 may be configured to perform one or more of detect presence of individual markers and/or individual parts of makers within a real-world environment, determine whether individual parts of individual markers are properly arranged and/or assembled to form the individual markers, present notifications prompting adjustment of individual parts of individual markers, and/or other operations. In some implementations, determining whether individual parts of individual markers are properly arranged and/or assembled may include one or more of determining locations of the individual parts of individual markers within the real-world environment, determining marker orientations of the individual parts of the individual markers within the real-world environment, and/or other operations. In some implementations, determining whether individual parts of individual markers are properly arranged and/or assembled may include one or more of determining whether the individual locations of the individual parts are within a threshold distance, determining whether the individual marker orientations are aligned, and/or other operations.

In some implementations, detection component 140 may detect the presence of individual markers and/or parts within a field of view of an image sensor included in one or more sensors 154. Detection component 140 may obtain the output signals generated by the image sensor. Detection component 140 may detect the presence of individual markers and/or parts of markers based on image information conveyed by the output signals, and/or other information. The image information may define visual content depicting the individual markers and/or other content. In some implementations, detection component 140 may utilize one or more image processing techniques to perform one or more of detect presence of the individual markers and/or parts, determine locations of the individual markers and/or parts within the real-world environment, determine marker orientations of the individual markers and/or parts within the real-world environment, and/or other operations. One or more image processing techniques may include one or more of bundle adjustment, speeded up robust features (SURF), scale-invariant feature transform (SIFT), computer vision, and/or other techniques.

By way of non-limiting illustration, detection component 140 may be configured to detect presence of one or more of the first part of the first marker, the second part of the first marker, other parts of the first marker, other parts of other markers, and/or other whole markers. The detection component 140 may be configured to determine whether the first part, the second part, and/or other parts are arranged to form the first marker. In some implementations, arrangement of the first part with the second part to form the first markers may require one or both of a first orientation of the first part to be aligned with a second orientation of the second part, and/or the first part to be within a threshold distance from the second part. By way of non-limiting illustration, detection component 140 may be configured to determine one or more of the first orientation of the first part, the second orientation of the second part, a first location of the first part, a second location of the second part, whether the first orientation is aligned with the second orientation, whether the first location and the second location are within the threshold distance, and/or other information. The detection component 140 may be configured to compare the first orientation with the second orientation to determine whether they are aligned. The detection component 140 may be configured to compare the first location to the second location to determine whether the first part and the second part are within the threshold distance.

The control component 144 may be configured to control second presentation device 132 (e.g., via display 152) to generate and/or present individual images of individual virtual objects, individual markers, and/or individual marker parts. The control component 144 may be configured to control second presentation device 132 (e.g., via display 152) to generate and/or present individual images of individual virtual objects associated with individual markers in response to determining parts of the individual markers are arranged to form the individual markers.

By way of non-limiting illustration, control component 144 may be configured to effectuate presentation of a first image of the first virtual object in response to determining the first part, the second part, and/or other parts are arranged to form the first marker. The first image of the first virtual object may be presented so that the first virtual object may be perceived as being located in the real-world environment. Further, control component 114 of first presentation device 102 may be configured to effectuate presentation of an image of the first virtual object in response to the second presentation device 132 determining the first part, the second part, and/or other parts are arranged to form the first marker. In this manner, the first presentation device 102 and the second presentation device 132 may have a shared experience.

In some implementations, control component 144 may be configured to effectuate presentation of one or more notifications prompting an adjustment of individual parts of markers until the individual parts are arranged to form a whole marker. By way of non-limiting illustration, control component 144 may be configured to, responsive to determining the first part and the second part are not arranged to form the first marker, effectuate presentation of a notification prompting an adjustment of the first presentation device 102 until the first part and the second part are arranged to form the first marker.

In some implementations, it is noted that the detection of markers and/or subsequent presentation of markers, marker parts, and/or virtual content may follow the technique of "nesting" markers as described herein. By way of non-limiting illustration, the detection component 140 of second presentation device 132 may be configured to detect presence of the second marker of the set of nested markers presented on the first presentation device 102. In response to the detection of the second marker, one or both of the first presentation device 102 and/or the second presentation device 132 may be configured to effectuate presentation of an image of the virtual object associated with the set of nested augmented reality markers so that the virtual object may be perceived as being located in the real-world environment.

FIGS. 3-10 illustrate various implementations of the system of FIG. 1 configured to present augmented reality content based on detection of augmented reality markers.

Figure 3:
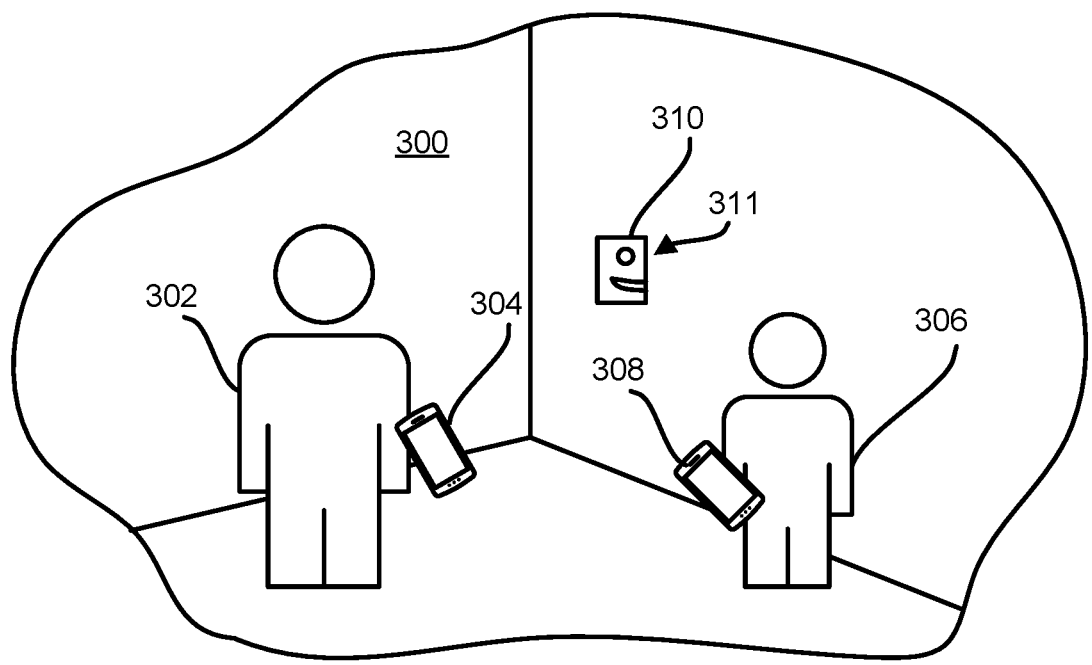
FIG. 3 shows a graphic illustration of an implementation of the system of FIG. 1.

FIG. 3 shows a graphic illustration of an implementation of the system of FIG. 1. FIG. 3 illustrates an interactive environment 300 including one or more of a first user 302, a first presentation device 304 used by the first user 302, a second user 306, a second presentation device 308 used by the second user 306, a physical object 310 depicting a first part 311 of a marker, and/or other content and/or components.

Figure 4:
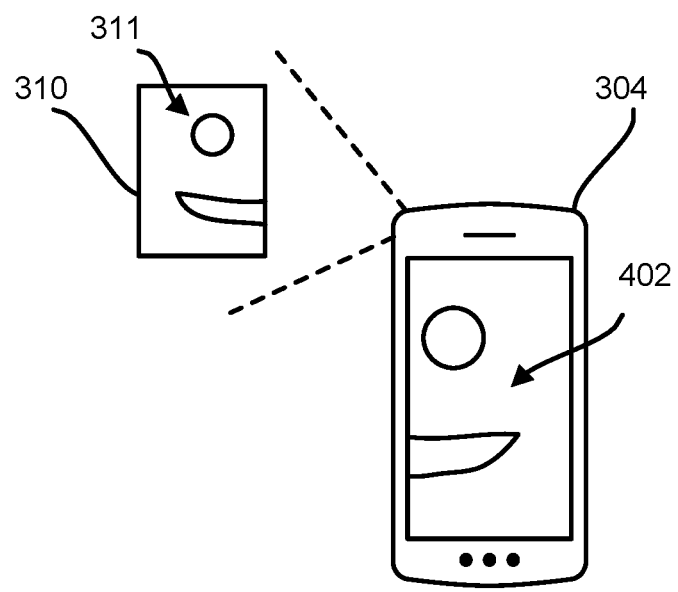
FIG. 4 shows a graphic illustration of an implementation of the system of FIG. 1.

FIG. 4 shows another graphic illustration of an implementation of the system of FIG. 1. In FIG. 4, the first presentation device 304 may detect presence of the first part 311 of the marker depicted on the physical object 310. The first presentation device 304 may effectuate presentation of a second part 402 of the marker in response to the detection of the first part 311 of the marker on the physical object 310. The first user 302 may be prompted to place the first presentation device 304 next to the physical object 310 to form the marker comprised of the first part 311 and second part 402.

Figure 5:
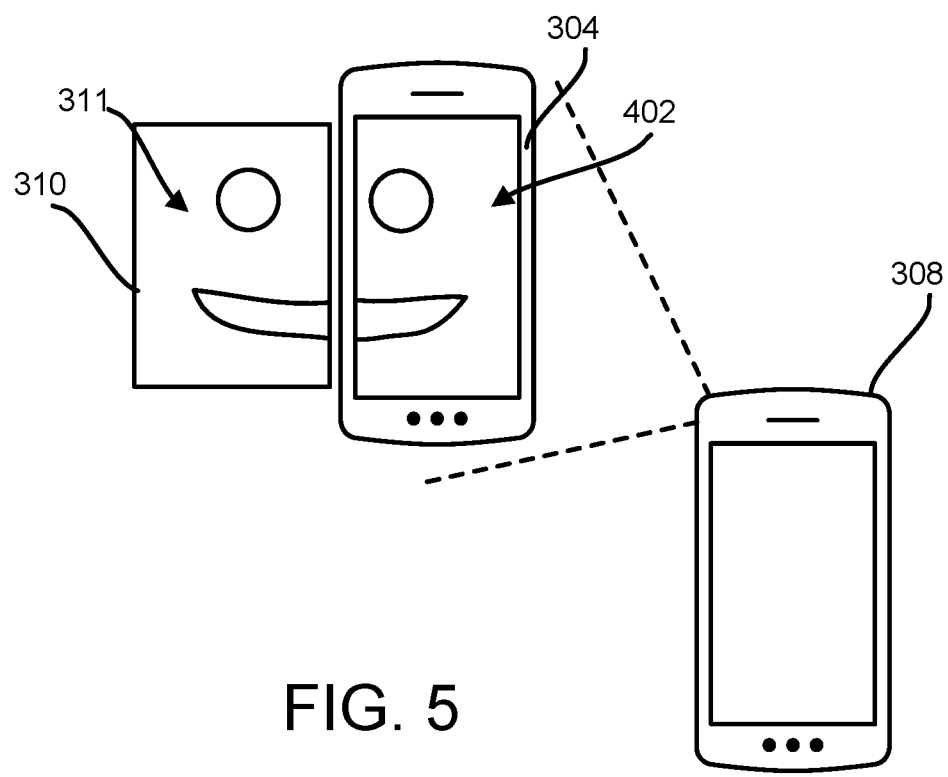
FIG. 5 shows a graphic illustration of an implementation of the system of FIG. 1.

FIG. 5 shows yet another graphic illustration of an implementation of the system of FIG. 1. In FIG. 5, the first presentation device 304 may be positioned next to the physical object 310 so that the first part 311 and the second part 402 may be arranged to form the marker comprised of the first part and second part 402. The arranged first part 311 and second part 402 may be detected by the second presentation device 308.

Figure 6:
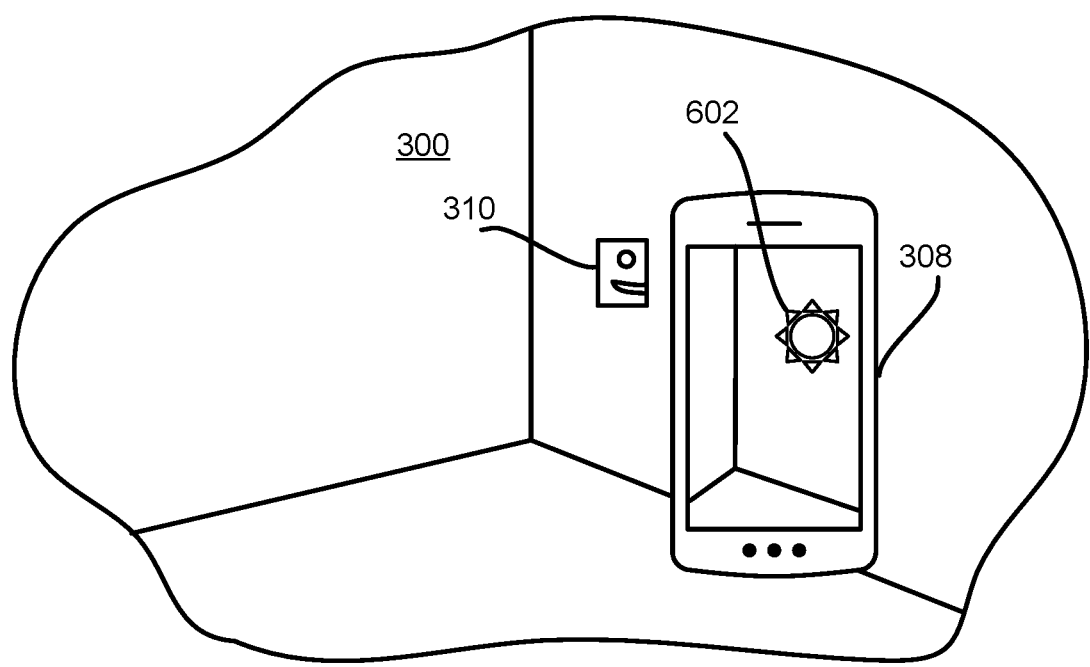
FIG. 6 shows a graphic illustration of an implementation of the system of FIG. 1.

FIG. 6 shows still another graphic illustration of an implementation of the system of FIG. 1. In FIG. 6, responsive to detecting presence of the first part and the second part, and/or determining the first part is arranged with the second part to form the marker, the second presentation device 308 may be configured to effectuate presentation of an image of a virtual object 602 so that the virtual object 602 may be perceived as being located in a real-world environment. In some implementations, the image of the virtual object 602 may be presented so that the virtual object 602 may appear as overlaying the physical object 310.

Figure 7:
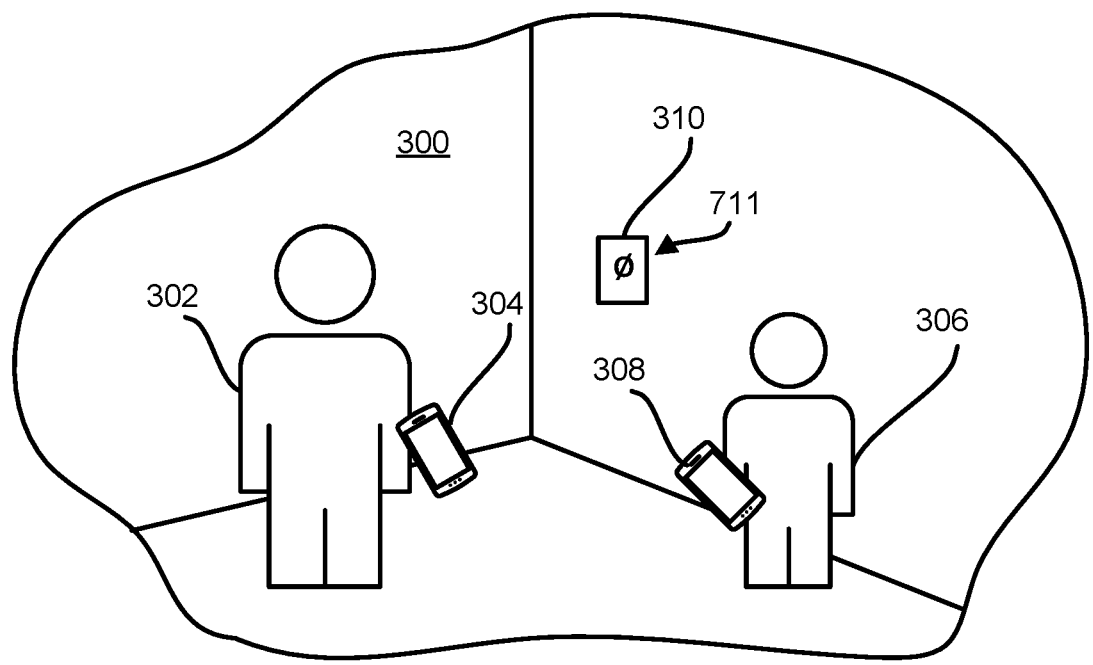
FIG. 7 shows a graphic illustration of an implementation of the system of FIG. 1.

FIG. 7 shows a graphic illustration of an implementation of the system of FIG. 1. FIG. 7 illustrates the interactive environment 300 including one or more of first user 302, first presentation device 304 used by the first user 302, second user 306, second presentation device 308 used by the second user 306, physical object 310 depicting a first marker 711, and/or other content and/or components. The first marker 711 may comprise a marker that may be ordered first within a set of nested markers.

Figure 8:
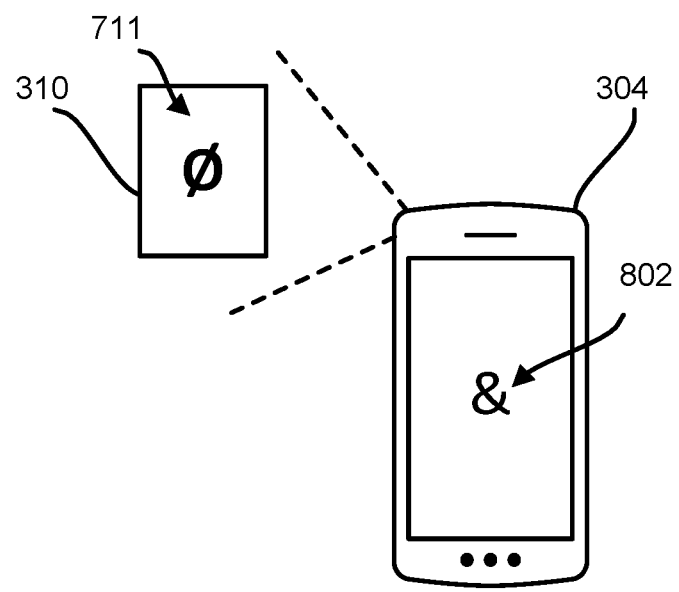
FIG. 8 shows a graphic illustration of an implementation of the system of FIG. 1.

FIG. 8 shows another graphic illustration of an implementation of the system of FIG. 1. In FIG. 8, the first presentation device 304 may detect presence of first marker 711. The first presentation device 304 may effectuate presentation of a second marker 802. The second maker may comprise a marker that may be ordered second within the set of nested markers.

Figure 9:
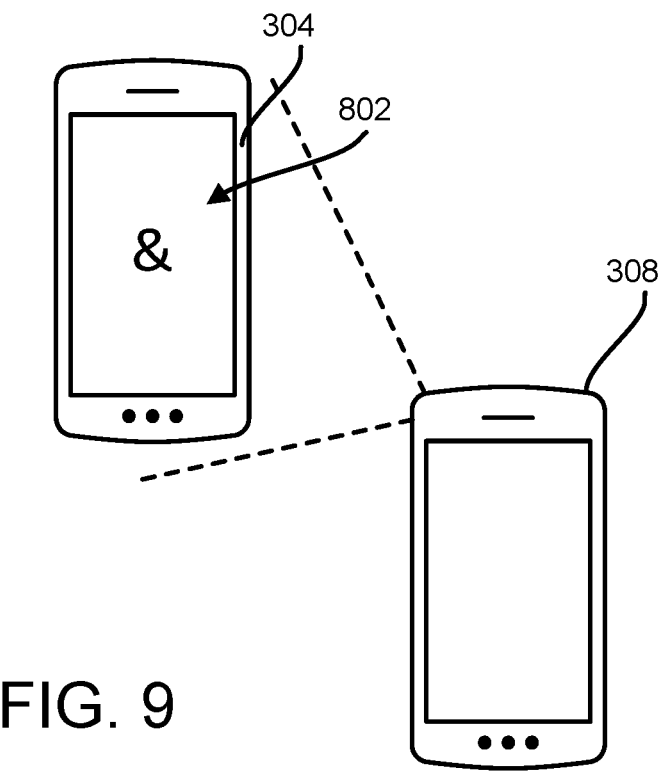
FIG. 9 shows a graphic illustration of an implementation of the system of FIG. 1.

FIG. 9 shows yet another graphic illustration of an implementation of the system of FIG. 1. In FIG. 9, the second presentation device 308 may detect presence of the second marker 802 displayed on the first presentation device 304. For illustrative purposes, the second marker 802 may be considered the highest ordered marker in the set of nested markers such that detection of the second marker 802 may facilitate presentation of a virtual object associated with the set of nested markers.

Figure 10:
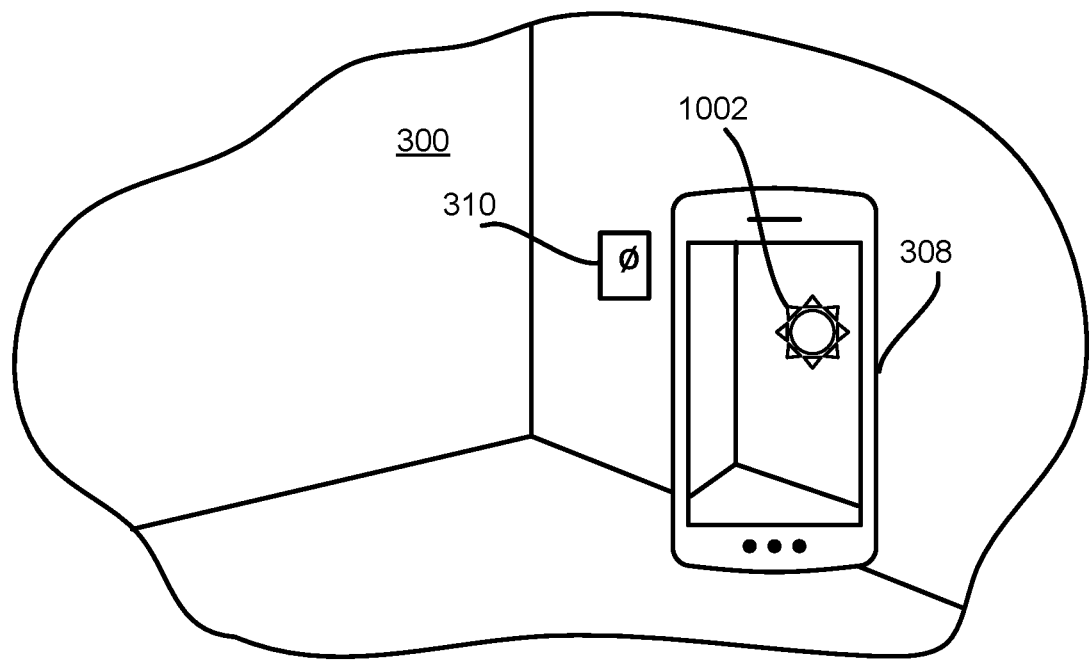
FIG. 10 shows a graphic illustration of an implementation of the system of FIG. 1.

FIG. 10 shows still another graphic illustration of an implementation of the system of FIG. 1. In FIG. 10, responsive to detecting presence the second marker (FIG. 9) the second presentation device 308 may be configured to effectuate presentation of an image of a virtual object 1002 associated with the set of nested markers so that the virtual object 1002 may be perceived as being located in a real-world environment.

Returning to FIG. 1, in some implementations, one or more servers 101 may include one or more physical processors including machine-readable instructions the same as or similar to the machine-readable instructions of the individual presentation devices, and/or may store one or more of virtual content information, marker information, and/or other information described herein as being stored by individual presentation devices. The one or more servers 101 may communicate with presentation devices via a client/server architecture. Responsive to detection of parts of markers by the individual presentation devices, the individual presentation devices may send requests to the one or more servers 101 for the virtual content information and/or marker information. The one or more servers 101 may communicate the information to the individual presentation device so that the individual presentation devices may present additional parts of the markers and/or virtual content associated with the markers.

In FIG. 1, external resource(s) 131 may include sources of information, hosts, and/or providers of information outside of system 100, external entities participating with system 100, and/or other resources. In some implementations, some or all of the functionality attributed herein to external resource(s) 131 may be provided by resources included in system 100. By way of non-limiting illustration, an external entity may be configured to provide virtual content information, marker information, and/or other information.

Individual presentation devices may include communication lines or ports to enable the exchange of information with one or more networks 130. The one or more networks 130 may include wired and/or wireless connections. By way of non-limiting illustration, one or more networks 130 may include one or more of the Internet, wireless Bluetooth Low Energy (BLE), wired Universal Serial Bus (USB) connection, and/or other connections. It will be appreciated that this is not intended to be limiting and that the scope of this disclosure includes implementations in which components of system 100 may be operatively linked via some other communication media.

Illustration of the first presentation device 102 in FIG. 1 is not intended to be limiting. The first presentation device 102 may include a plurality of hardware, software, and/or firmware components operating together to provide the functionality attributed herein to the presentation devices. For example, first presentation device 102 may be implemented by a cloud of computing platforms operating together.

Illustration of the second presentation device 132 in FIG. 1 is not intended to be limiting. The second presentation device 132 may include a plurality of hardware, software, and/or firmware components operating together to provide the functionality attributed herein to the presentation devices. For example, second presentation device 132 may be implemented by a cloud of computing platforms operating together.

Electronic storage 120 of first presentation device 102 may include electronic storage media that electronically stores information. The electronic storage media of electronic storage 120 may include one or both of system storage that is provided integrally (i.e., substantially non-removable) with first presentation device 102 and/or removable storage that is removably connectable to first presentation device 102 via, for example, a port or a drive. A port may include a USB port, a firewire port, and/or other port. A drive may include a disk drive and/or other drive. Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 120 may include one or more virtual storage resources (e.g., cloud storage, a virtual private network, and/or other virtual storage resources). Electronic storage 120 may store software algorithms, information determined by processor(s) 104, information received from external resource(s) 131, and/or other information that enables system 100 to function as described herein. Electronic storage 150 of second presentation device 132 may have similar features and/or may provide similar functionality to second presentation device 132 as electronic storage 120 provides to first presentation device 102.

Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108, 110, and/or 114. Processor(s) 104 may be configured to execute components 108, 110, and/or 114 by software; hardware; firmware; some combination of software, hardware, and/or firmware; and/or other mechanisms for configuring processing capabilities on processor(s) 104.

It should be appreciated that although components 108, 110, and/or 114 are illustrated in FIG. 1 as being co-located within a single processing unit, in implementations in which processor(s) 104 includes multiple processing units, one or more of components 108, 110, and/or 114 may be located remotely from the other components. While computer program components are described herein as being implemented via processor(s) 104 through machine readable instructions 106, this is merely for ease of reference and is not meant to be limiting. In some implementations, one or more functions of computer program components described herein may be implemented via hardware (e.g., dedicated chip, field-programmable gate array). One or more functions of computer program components described herein may be one or more of software-implemented, hardware-implemented, and/or software and hardware-implemented. The description of the functionality provided by the different components 108, 110, and/or 114 described above is for illustrative purposes and is not intended to be limiting, as any of components 108, 110, and/or 114 may provide more or less functionality than is described. For example, one or more of components 108, 110, and/or 114 may be eliminated, and some or all of its functionality may be provided by other ones of components 108, 110, and/or 114 and/or other components. As another example, processor(s) 104 may be configured to execute one or more additional components that may perform some or all of the functionality attributed to one of components 108, 110, and/or 114.

Although processor(s) 134 is shown in FIG. 1 as a single entity, this is for illustrative purposes only. In some implementations, processor(s) 134 may include one or more processing units. These processing units may be physically located within the same device, or processor(s) 134 may represent processing functionality of a plurality of devices operating in coordination. The processor(s) 134 may be configured to execute components 138, 140, and/or 144. Processor(s) 134 may be configured to execute components 138, 140, and/or 144 by software; hardware; firmware; some combination of software, hardware, and/or firmware; and/or other mechanisms for configuring processing capabilities on processor(s) 134.

It should be appreciated that although components 138, 140, and/or 144 are illustrated in FIG. 1 as being co-located within a single processing unit, in implementations in which processor(s) 134 includes multiple processing units, one or more of components 138, 140, and/or 144 may be located remotely from the other components. While computer program components are described herein as being implemented via processor(s) 134 through machine readable instructions 136, this is merely for ease of reference and is not meant to be limiting. In some implementations, one or more functions of computer program components described herein may be implemented via hardware (e.g., dedicated chip, field-programmable gate array). One or more functions of computer program components described herein may be one or more of software-implemented, hardware-implemented, and/or software and hardware-implemented. The description of the functionality provided by the different components 138, 140, and/or 144 described above is for illustrative purposes and is not intended to be limiting, as any of components 138, 140, and/or 144 may provide more or less functionality than is described. For example, one or more of components 138, 140, and/or 144 may be eliminated, and some or all of its functionality may be provided by other ones of components 138, 140, and/or 144 and/or other components. As another example, processor(s) 134 may be configured to execute one or more additional components that may perform some or all of the functionality attributed to one of components 138, 140, and/or 144.

Figure 2:
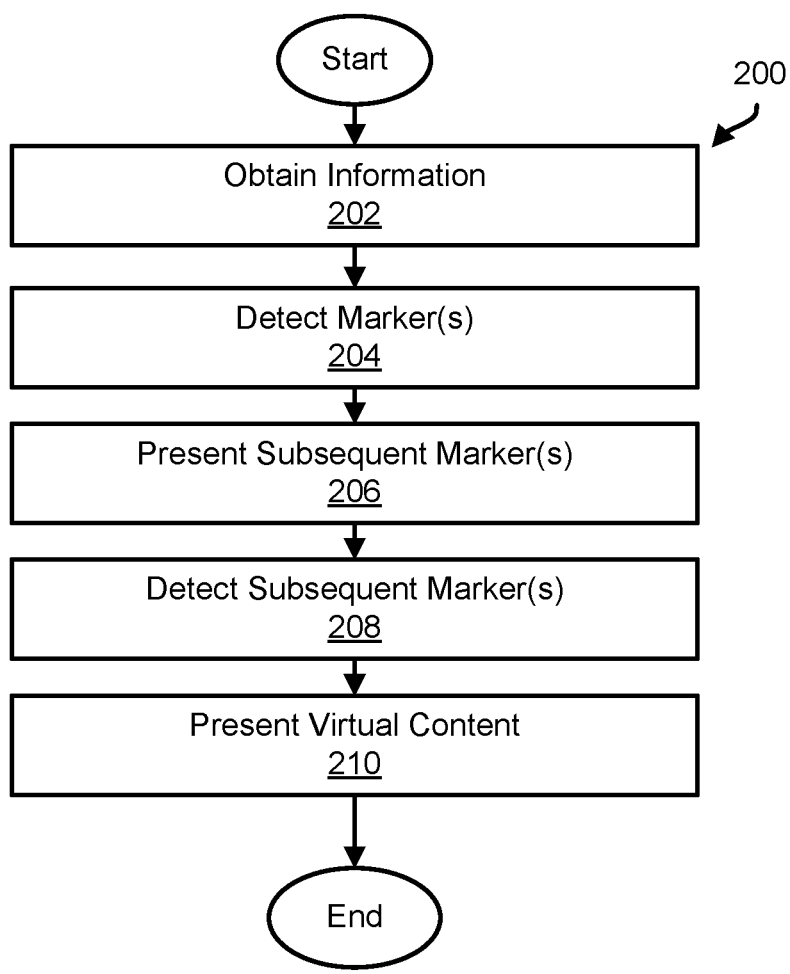
FIG. 2 illustrates a method to present interactive content based on detection of markers, in accordance with one or more implementations.

FIG. 2 illustrates a method 200 to present augmented reality content based on detection of augmented reality markers, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in a computer system comprising one or more processing devices (e.g., a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 200 in response to instructions stored electronically on electronic storage media. The one or more processing devices may include one or more devices configured through hardware, firmware, and/or software to be specifically designed for execution of one or more of the operations of method 200. By way of non-limiting illustration, method 200 may be implemented in a presentation device the same as or similar to first presentation device 102 and/or second presentation device 132 (shown in FIG. 1 and described herein).

At an operation 202, virtual content information, marker information, and/or other information may be obtained. The virtual content information may define a virtual environment including virtual content. The virtual content may include one or more virtual objects. The marker information may define a set of augmented reality markers and/or specifying an association of a virtual object with the set of augmented reality markers. In some implementations, operation 202 may be performed by one or more physical processors executing a content component the same as or similar to content component 108 and/or 138 (shown in FIG. 1 and described herein).

At an operation 204, presence may be detected of individual markers included in a set of nested augmented reality markers. By way of non-limiting illustration, presence of a first marker in the set may be detected by a first presentation device. In some implementations, operation 204 may be performed by one or more physical processors executing a detection component the same as or similar to detection component 110 and/or 140 (shown in FIG. 1 and described herein).

At an operation 206, individual subsequent markers included in the set of nested augmented reality markers may be presented in response to detection of prior individual markers in the set of nested augmented reality markers. By way of non-limiting illustration, the first presentation device may present an image of a second marker of the set of augmented reality markers in response to the detection of the first marker. In some implementations, operation 206 may be performed by one or more physical processors executing a control component the same as or similar to control component 114 and/or 144 (shown in FIG. 1 and described herein).

At an operation 208, presence may be detected of subsequently presented individual markers of the set of nested augmented reality markers. By way of non-limiting illustration, a second presentation may detect presence of the second marker presented on the first presentation device. In some implementations, operation 208 may be performed by one or more physical processors executing a detection component the same as or similar to detection component 110 and/or 140 (shown in FIG. 1 and described herein).

At an operation 210, presentation may be effectuated of virtual content associated with the set of nested augmented reality markers. By way of non-limiting illustration, in response to the detection of the second marker and/or other subsequent markers in the set of nested augmented reality markers, one or both of the first presentation device or the second presentation device may present an image of the virtual object associated with the set of nested augmented reality markers so that the virtual object may be perceived as being located in the real-world environment. In some implementations, operation 210 may be performed by one or more physical processors executing a control component the same as or similar to control component 114 and/or 144 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to present virtual content based on detection of augmented reality markers, the system comprising:
   non-transitory electronic storage configured to store virtual content information and marker information, the virtual content information defining virtual content, the virtual content including one or more virtual objects, the marker information defining a set of augmented reality markers and specifying an association of a virtual object with the set of augmented reality markers;
   one or more presentation devices configured to generate images of the virtual content, an individual presentation device being configured to present the images of the virtual content so that the virtual content is perceived by a user as being located in a real-world environment; and
   one or more physical processors configured by the machine-readable instructions to:
      detect, by a first presentation device, presence of a first marker of the set of augmented reality markers;
      in response to detecting the first marker, effectuate, by the first presentation device, presentation of an image of a second marker of the set of augmented reality markers;
      detect, by a second presentation device, presence of the second marker presented by the first presentation device;
      in response to detecting the second marker, determine, by the second presentation device from the marker information, the virtual object is associated with the set of augmented reality markers including the second marker; and
      effectuate, based on determining the virtual object is associated with the set of augmented reality markers including the second marker, by the second presentation device, presentation of an image of the virtual object so that the virtual object is perceived as being located in the real-world environment.

2. The system of claim 1, wherein the one or more physical processors are further configured by the machine-readable instructions to effectuate presentation, by the first presentation device, of the image of the virtual object, and wherein the presentation of the image of the virtual object by one or both of the first presentation device or the second presentation device requires the detection of the first marker by the first presentation device to occur before the detection of the second marker by the second presentation device.

3. The system of claim 1, wherein the individual markers in the set of augmented reality markers comprise individual glyphs.

4. The system of claim 1, wherein the first presentation device comprises a mobile computing platform.

5. The method of claim 1, wherein the individual markers in the set of augmented reality markers comprise individual glyphs.

6. A system configured to present virtual content based on detection of augmented reality markers, the system comprising:
   non-transitory electronic storage configured to store virtual content information and marker information, the virtual content information defining virtual content, the virtual content including one or more virtual objects, the marker information defining a set of augmented reality markers and specifying an association of a virtual object with the set of augmented reality markers;
   one or more presentation devices configured to generate images of the virtual content, an individual presentation device being configured to present the images of the virtual content so that the virtual content is perceived by a user as being located in a real-world environment;
   one or more physical processors configured by the machine-readable instructions to:
      detect, by a first presentation device, presence of a first marker of the set of augmented reality markers;
      in response to detecting the first marker, effectuate, by the first presentation device, presentation of an image of a second marker of the set of augmented reality markers;
      detect, by a second presentation device, presence of the second marker presented by the first presentation device; and
      in response to detecting the second marker, effectuate, by one or both of the first presentation device or the second presentation device, presentation of an image of the virtual object so that the virtual object is perceived as being located in the real-world environment;
   wherein a third marker is associated with a second virtual object, the third marker being comprised of a first part and a second part, and the one or more physical processors are further configured by the machine-readable instructions to:
      detect, by the first presentation device, presence of the first part of the third marker;
      effectuate, by the first presentation device, presentation of the second part of the third marker;
      detect, by the second presentation device, presence of the first part and the second part of the third marker;
      determine, by the second presentation device, whether the first part and the second part are arranged to form the third marker;
      responsive to determining the first part and the second part are arranged to form the third marker, effectuate, by one or both of the first presentation device or second presentation device, presentation of an image of the second virtual object; and
      responsive to determining the first part and the second part are not arranged to form the third marker, effectuate, by one or both of the first presentation device or the second presentation device, presentation of a notification prompting an adjustment of the first presentation device until the first part and the second part are arranged to form the third marker.

7. The system of claim 6, wherein the arrangement of the first part with the second part to form the third marker requires a first heading of the first part to be aligned with a second heading of the second part, the first part to be within a threshold distance from the second part, or a combination thereof.

8. The system of claim 7, wherein the one or more physical processors are further configured by the machine-readable instructions to:
   determine, by the second presentation device, the first heading of the first part and the second heading of the second part;
   determine, by the second presentation device, a first location of the first part and a second location of the second part;
   determine, by the second presentation device, that the first heading is aligned with the second heading; and
   determine, by the second presentation device, that the first location and the second location are within the threshold distance.

9. The system of claim 8, wherein determining that the first heading is aligned with the second heading includes determining that the first heading is parallel, orthogonal, in-line, or co-axial to the second heading.

10. The system of claim 6, wherein the first part of the third marker is presented on a physical object present in the real-world environment.

11. The system of claim 6, wherein the first part of the third marker is presented by a third presentation device.

12. A method to present virtual content based on detection of augmented reality markers, the method comprising:
   obtaining virtual content information and marker information, the virtual content information defining virtual content, the virtual content including one or more virtual objects, the marker information defining a set of augmented reality markers and specifying an association of a virtual object with the set of augmented reality markers;
   detecting, by a first presentation device, presence of a first marker of the set of augmented reality markers;
   in response to detecting the first marker, effectuating, by the first presentation device, presentation of an image of a second marker of the set of augmented reality markers;
   detecting, by a second presentation device, presence of the second marker presented by the first presentation device;
   in response to detecting the second marker, determining, by the second presentation device from the marker information, the virtual object is associated with the set of augmented reality markers including the second marker; and
   effectuating, based on determining the virtual object is associated with the set of augmented reality markers including the second marker, by the second presentation device, presentation of an image of the virtual object so that the virtual object is perceived as being located in the real-world environment.

13. The method of claim 12, wherein the method further comprises effectuating presentation, by the first presentation device, of the image of the virtual object, and wherein the effectuating presentation of the image of the virtual object by one or both of the first presentation device or the second presentation device requires the detection of the first marker by the first presentation device to occur before the detection of the second marker by the second presentation device.

14. The method of claim 12, wherein the first presentation device comprises a mobile computing platform.

15. A method to present virtual content based on detection of augmented reality markers, the method comprising:
   obtaining virtual content information and marker information, the virtual content information defining virtual content, the virtual content including one or more virtual objects, the marker information defining a set of augmented reality markers and specifying an association of a virtual object with the set of augmented reality markers;
   detecting, by a first presentation device, presence of a first marker of the set of augmented reality markers;
   in response to detecting the first marker, effectuating, by the first presentation device, presentation of an image of a second marker of the set of augmented reality markers;
   detecting, by a second presentation device, presence of the second marker presented by the first presentation device; and
   in response to detecting the second marker, effectuating, by one or both of the first presentation device or the second presentation device, presentation of an image of the virtual object so that the virtual object is perceived as being located in the real-world environment; and
   wherein a third marker is associated with a second virtual object, the third marker being comprised of a first part and a second part, and the method further comprises:
   detecting, by the first presentation device, presence of the first part of the third marker;
   effectuating, by the first presentation device, presentation of the second part of the third marker;
   detecting, by the second presentation device, presence of the first part and the second part of the third marker;
   determining, by the second presentation device, whether the first part and the second part are arranged to form the third marker;
   responsive to determining the first part and the second part are arranged to form the third marker, effectuating, by one or both of the first presentation device or second presentation device, presentation of an image of the second virtual object; and
   responsive to determining the first part and the second part are not arranged to form the third marker, effectuating, by one or both of the first presentation device or the second presentation device, presentation of a notification prompting an adjustment of the first presentation device until the first part and the second part are arranged to form the third marker.

16. The method of claim 15, wherein the arrangement of the first part with the second part to form the third marker requires a first heading of the first part to be aligned with a second heading of the second part, the first part to be within a threshold distance from the second part, or a combination thereof.

17. The method of claim 16, further comprising:
   determining, by the second presentation device, the first heading of the first part and the second heading of the second part;
   determining, by the second presentation device, a first location of the first part and a second location of the second part;
   determining, by the second presentation device, that the first heading is aligned with the second heading; and
   determining, by the second presentation device, that the first location and the second location are within the threshold distance.

18. The method of claim 17, wherein determining that the first heading is aligned with the second heading includes determining that the first heading is parallel, orthogonal, in-line, or co-axial to the second heading.

19. The method of claim 15, wherein the first part of the third marker is presented on a physical object present in the real-world environment.

20. The method of claim 15, wherein the first part of the third marker is presented by a third presentation device.

21. A system configured to present virtual content based on detection of augmented reality markers, the system comprising:

non-transitory electronic storage configured to store virtual content information and marker information, the virtual content information defining virtual content, the virtual content including one or more virtual objects, the marker information defining a set of augmented reality markers and specifying an association of a virtual object with the set of augmented reality markers, wherein a marker is associated with a virtual object, the marker being comprised of a first part and a second part;

one or more presentation devices configured to generate images of the virtual content, an individual presentation device being configured to present the images of the virtual content so that the virtual content is perceived by a user as being located in a real-world environment; and one or more physical processors configured by the machine-readable instructions to:

detect, by a first presentation device, presence of the first part of the marker;

effectuate, by the first presentation device, presentation of the second part of the marker;

detect, by a second presentation device, presence of the first part and the second part of the marker;

determine, by the second presentation device, whether the first part and the second part are arranged to form the marker;

responsive to determining the first part and the second part are arranged to form the marker, effectuate, by one or both of the first presentation device or the second presentation device, presentation of an image of the virtual object; and responsive to determining the first part and the second part are not arranged to form the marker, effectuate, by one or both of the first presentation device or the second presentation device, presentation of a notification prompting an adjustment of the first presentation device until the first part and the second part are arranged to form the marker.

* * * * *